United States Patent [19]

Reist

[11] Patent Number: 4,538,161

[45] Date of Patent: Aug. 27, 1985

[54] APPARATUS FOR ADDRESSING NEWSPAPERS, JOURNALS AND OTHER PRINTED PRODUCTS

[75] Inventor: Walter Reist, Hinwil, Switzerland

[73] Assignee: Ferag AG, Hinwil, Switzerland

[21] Appl. No.: 497,141

[22] Filed: May 23, 1983

[30] Foreign Application Priority Data

Jun. 1, 1982 [CH] Switzerland ........................ 3348/82

[51] Int. Cl.[3] ........................ G01D 15/18; B65H 25/04

[52] U.S. Cl. .................................. 346/140 R; 346/75; 226/11; 226/173

[58] Field of Search ............. 346/75, 140 R; 358/296; 271/204; 355/18; 226/33, 11, 173

[56] References Cited

U.S. PATENT DOCUMENTS

| | | | |
|---|---|---|---|
| 4,176,944 | 12/1979 | Payrhammer | 355/18 |
| 4,320,894 | 3/1982 | Reist et al. | 271/277 |
| 4,378,564 | 3/1983 | Cross et al. | 346/75 |

*Primary Examiner*—E. A. Goldberg

*Assistant Examiner*—Gerald E. Preston

*Attorney, Agent, or Firm*—Werner W. Kleeman

[57] ABSTRACT

A conveying device directs printed products past a stationarily arranged ink jet printer. A control system initiates a printing operation by the printer each time a printed product passes through the effective printing zone or region of the printer. The conveying device comprises an individual conveyor equipped with gripper units arranged in spaced relationship from each other, each of which is structured to take-up or engage one printed product. The control system includes a pulse generator driven by the individual conveyor and transmits a control pulse for each one of the gripper units. The control pulse is suppressed by a monitor responsive to empty gripper units. Since the printed products are conveyed by the gripper units, their reference position relative to the conveying device is defined over the entire product conveying path. The control signal initiating the printing operation thus can be utilized for initiating other operations after passing through a delay element.

4 Claims, 2 Drawing Figures

APPARATUS FOR ADDRESSING NEWSPAPERS, JOURNALS AND OTHER PRINTED PRODUCTS

BACKGROUND OF THE INVENTION

The present invention relates to a new and improved apparatus for addressing newspapers, journals, periodicals and other printed products. The present invention also relates to a new and improved shipping system or line containing such apparatus for addressing newspapers, journals, periodicals and other printed products.

In its more specific aspects, the invention relates to a new and improved construction of apparatus for addressing newspapers, journals, periodicals and other printed products, which apparatus is of the type comprising a stationary printer, typically an ink jet printer, and conveying means for guiding the printed products past the printer, the conveying means and printer having matched conveying and printing velocities. Control means serve for initiating a printing operation of the printer each time a printed product passes through the printing zone or region of the printer.

An apparatus of such type is known, for example, from the printed publication entitled "Video Jet Mailer", issued by A. B. Dick Company, Elk Grove Village, Ill., U.S.A., in 1980. In this apparatus the printed products to be addressed are continuously conveyed past downwardly directed printing heads of an ink jet printer while more or less freely resting upon a conveyor belt and while in spaced relation from each other.

The arrival of each single specimen or copy at the printing zone of the ink jet printer is directly sensed by an electronic detector which, then, initiates the printing operation. With this system there can be taken into account irregular gaps or spacings between consecutive printed products, so that each printed product can be addressed in the zone or region provided therefor. However, the known apparatus is hardly capable of synchronously addressing the entire output of a rotary printing press arriving in an imbricated product formation. For this purpose either the conveying velocity of the printed products would have to be increased, i.e. the product stream arriving in an imbricated formation would have to be spread apart to such an extent that gaps are formed between consecutive ones of the printed products, or else the individual product specimens would have to be directly seized or engaged in the arriving imbricated product stream or formation, something which is associated with appreciable difficulties and thus unreliable. However, it is in no way the ink jet printer which in the first instance opposes increasing the feed or conveying velocity of the printed products reposing upon the conveyor belt, since each printing head in modern day ink jet printers, wherein one printing head is provided for each line of the address to be printed, is capable of printing far more than one thousand characters per second. Quite to the contrary, it is more so the printed products themselves which have a certain mass and at the same time possess a certain vulnerability to damage which cannot readily withstand such an increase in the conveying velocity.

Additionally, the signal initiating the printing operation in the aforementioned known apparatus becomes meaningless after having initiated the printing operation. This is so because the relative position of each printed product with respect to the conveying device is undefined or at least only momentarily defined, since the printed product, as already mentioned, rests freely upon a conveyor belt. Accordingly, the utilization of this signal is restricted to the printing operation.

SUMMARY OF THE INVENTION

Therefore, with the foregoing in mind, it is a primary object of the present invention to provide a new and improved apparatus for addressing newspapers, journals, periodicals and other printed products which ensures for a clean, reliable and uniform addressing of such products.

Another important object of the present invention is directed to the provision of a new and improved construction of apparatus for addressing newspapers, journals, periodicals and other printed products in which, if desired, a control pulse can be effectively evaluated and utilized for initiating further operations upon the addressed printed products.

Still a further important object of the present invention is concerned with a forwarding or shipping system utilizing such an apparatus, wherein there is enabled in conjunction therewith reliable sorting and collection of the addressed products.

Now in order to implement these and still further objects of the invention, which will become more readily apparent as the description proceeds, the apparatus of the present development is manifested by the features that, the conveying means comprise an individual conveyor equipped with gripper units or grippers arranged in series in spaced relationship from each other. Each gripper or gripper unit serves to take-up one of the printed products. The control means comprises a pulse generator driven by the individual conveyor and transmits a control pulse for each gripper unit as well as a monitor responsive to empty gripper units in order to suppress the control pulse.

Regarding the forwarding or shipping system of the present development such is manifested by the features that, the section of the individual conveyor following the addressing apparatus is directed past collecting stations, each of which contains an opening device for opening the gripper units. Each such opening device can be selectively placed into an operative and an inoperative position by a computer associated with the printer as a function of the control pulse, so that the addressed printed products are selectively delivered to respective collecting stations in accordance with their address.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
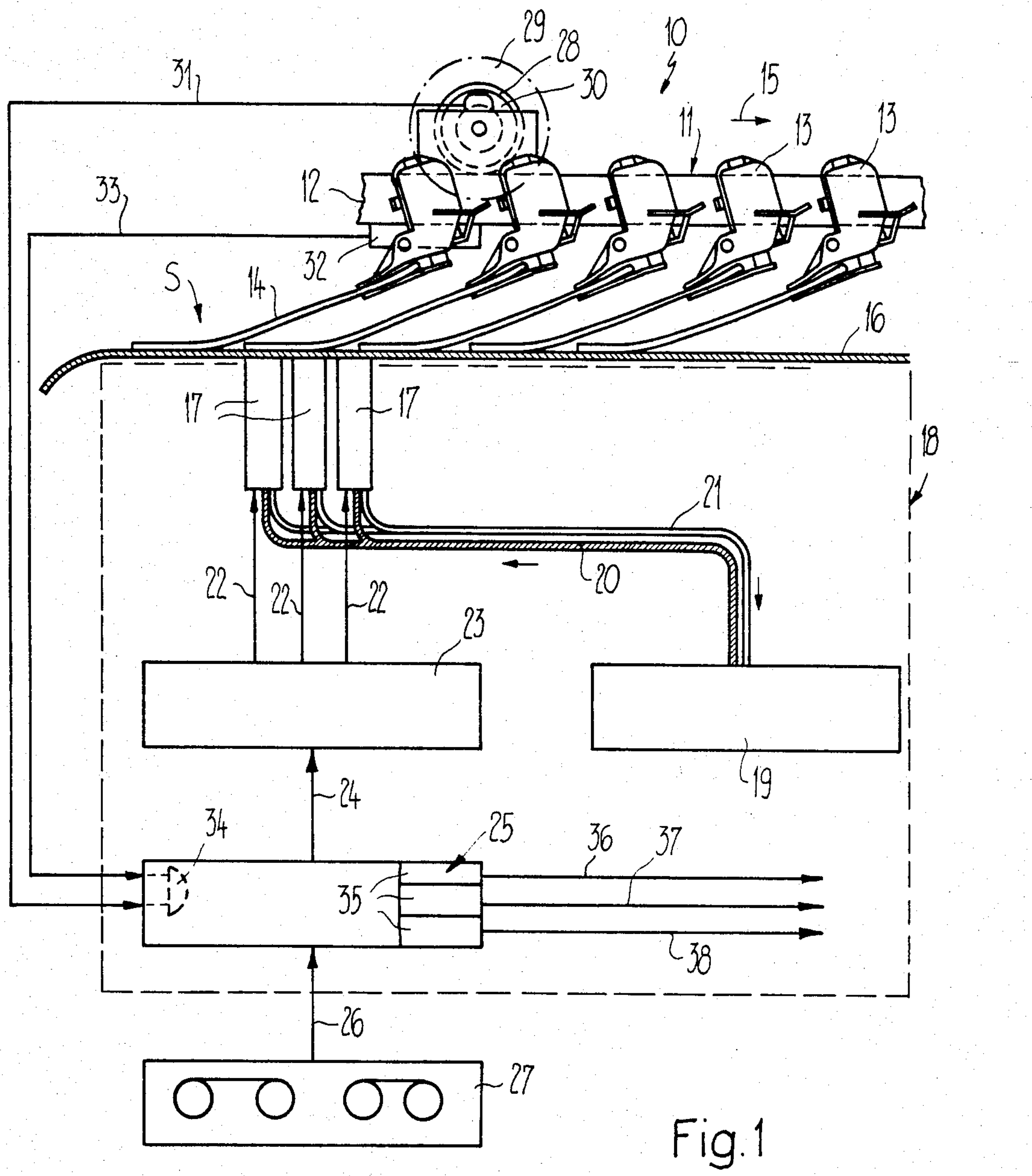
FIG. 1 is a schematic side view of an exemplary embodiment of apparatus constructed according to the present invention.

Describing now the drawings, it is to be understood that only enough of the construction of the addressing apparatus and the forwarding or shipping system has been shown therein as needed for those skilled in the art to readily understand the underlying principles and concepts of the present development, while simplifying the showing of the drawings. Turning attention now specifically to FIG. 1, there has been schematically illustrated in side view an exemplary embodiment of the addressing apparatus 10 which contains an individual conveyor 11. The individual or single-file conveyor 11 can be constructed as described, for example, in U.S. Pat. No. 3,955,667 and the cognate Swiss Pat. No. 592,562. It is equipped with gripper units or grippers 13 mounted in spaced relationship from each other on any suitable traction means, such as a chain structure (not shown), which is guided in a hollow rail 12.

Each gripper unit or gripper 13 engages the leading edge of a printed product which, in the illustrated exemplary embodiment, constitutes the leading fold or fold region of a newspaper 14 and conveys the same in the direction of the arrow 15. The trailing edges of these newspapers 14 slide upon the slide or guide rails 16. The formation assumed by the newspapers 14 as they are conveyed thus constitutes a spread imbricated product formation S in which the distance between the individual products forming the imbricated product formation, i.e. the distance between consecutive leading edges thereof, varies within very small tolerances and remains essentially the same over the entire conveying path of the individual conveyor 11.

A set of printing or injection heads 17 of an ink jet printer, generally designated in its entirety by reference numeral 18, is arranged below the slide or guide rails 16. The printing heads 17 are directed from below towards the imbricated formation S. One respective line of the address to be printed on the newspapers 14 is associated with one of the printing heads 17 of which three are shown. The printing heads 17 are therefore arranged offset from each other in a direction extending at right angles with respect to the plane of the drawing.

The ink jet printer 18 essentially may comprise the printer device marketed by the aforementioned A. B. Dick Company under their commercial designation or product name "Video Jet Series 9400". Such an ink jet printer 18 comprises an ink system or preparation device 19 for the printing ink from which a pressure line 20 extends to each of the printing or injection heads 17 while a respective return line 21 extends from such printing or injection heads 17 and is directed back to the preparation device 19. This preparation device or ink system 19 ensures that a current of ink is supplied to each of the printing or injection heads 17 at a pressure which is maintained constant in an adjustable manner.

To subdivide the supplied current of ink into a close sequence of ink droplets, in the present case 66,000 droplets per second, and to charge the droplets as well as to deflect the same in the desired direction, each printing head 17 is operatively coupled via a set of control lines 22 to a control unit 23. The control unit 23 is activated via a data channel 24 extending from the output side of a microcomputer or computer 25 which in the present case may be, for example, computer model PDP 11/03 available from Digital Equipment Corporation.

The data to be processed in the computer 25 is supplied to the same via a data channel 26 from an external address storage 27 in which, for example, the addresses to be printed are stored on magnet tape.

Further details concerning the structure and mode of operation of the ink jet printer 18 can be derived from the literature concerning "Video Jet" ink jet printers available from the aforementioned A. B. Dick Company.

Contrary to the known apparatus the computer 25, in the embodiment illustrated herein, is not directly activated by the presence or the arrival of a newspaper 14 at the operable zone or region of the printing heads 17. Quite to the contrary, a pulse or clock generator 28 is provided which is driven by the individual conveyor 11 by means of a sprocket wheel 29. The clock or pulse generator 28 is combined with a tachometer generator or tachometer 30 and supplies a control pulse, each time a gripper unit or gripper 13 arrives, by means of a signal line 31 to the computer 25. Since it cannot be excluded that at the individual conveyor 11 a gripper unit or gripper 13 periodically remains empty, for example, due to prior removal of a defective product copy or specimen, a monitor 32 which, for example, may be constituted by an operating or work contact actuated by the newspaper 14 and which responds to an empty gripper unit or gripper 13, is operatively associated with the clock or pulse generator 28. The monitor 32 prevents the computer 25 from becoming activated by the control signal supplied by the clock or pulse generator 25 when a related gripper 13 is empty. In case that the monitor 32 comprises an operating or work contact it will suffice for this purpose to deliver the output signal thereof via a further signal line 33 firstly to a coincidence circuit like, for example, an AND-gate 34 present in the computer 25. It is thus ensured that the printing operation will only be initiated when the gripper units or grippers 13 actually contain a newspaper 14.

The control signal initiated by the gripper unit or gripper 13 and thus associated therewith, if validated by the monitor 32, is an address-specific control signal which is not only utilized to initiate the printing operation but also is supplied in the computer 25 to one of a number of shift registers 35 in accordance with one address parameter as, for example, the postal code. The shift registers 35 have different data passage or through-pass times and a respective signal line 36, 37, 38 extends from each of the shift registers 35.

After the address-specific control signal has passed through one of the shift registers 35 the newspaper 14 associated with that address has been moved through a defined distance by the gripper unit or gripper 13 holding this newspaper 14. The corresponding printing operation has long been completed when the address-specific control signal thus is present on one of the signal lines 36, 37 or 38 but the gripper unit or gripper 13 retaining the corresponding newspaper 14 is present at a location which is dependent upon the passage time through the respective shift register 35.

Figure 2:
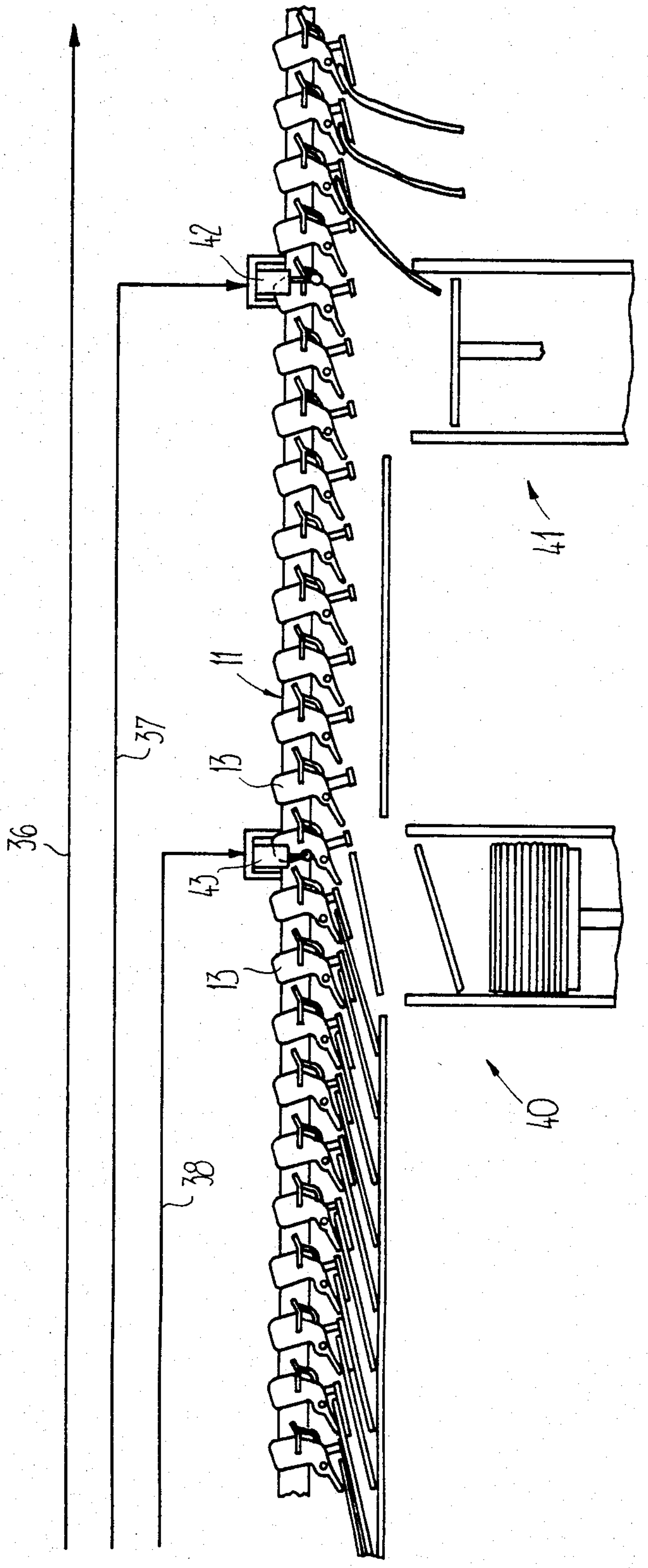
FIG. 2 is a schematic side view of a forwarding or shipping system according to the invention which contains the apparatus shown in FIG. 1 arranged forwardly or upstream thereof.

Accordingly, the signal lines 36, 37, 38 in the shipping or forwarding system shown in FIG. 2 lead to collecting or collating stations 40, 41 arranged along the travel path of the individual conveyor 11, more precisely, to suitable control elements 42 and 43 and so forth of opening devices arranged at respective collecting stations 40, 41 and so forth designed to open the gripper units or grippers 13. In the embodiment illustrated in FIG. 2, the signal lines 37 and 38 lead to corresponding control elements 42 and 43, respectively, while the signal line 36 extends to a not particularly illustrated collecting station arranged still further downstream with respect to the individual conveyor 11. Such further evaluation or utilization of the address-specific control signals generated by the computer 25, however, is only possible because the control signals are recalled or enabled only by gripper units or grippers 13 which hold a newspaper 14 but not by the newspaper 14 itself. The address-specific control signals which have initiated the printing operation practically without any time-delay thus in a way so-to-speak "accompany" or are logially associated with the respective gripper unit or gripper 13 and cause the same to be opened, and thus, to release the newspaper 14 at a location which is dependent upon an address parameter.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for addressing newspapers, journals, periodicals and other printed products, comprising:

a stationary printer defining a printing station for applying an address to the printed products;

conveying means for guiding said printed products past said printer;

said conveying means and said printer having coordinated conveying and printing velocities;

said conveying means comprising an individual conveyor equipped with gripper units arranged in spaced relationship from each other and structured to each take-up one of said printed products;

control means associated with said individual conveyor and including means for generating a control pulse at the passage of each one of said gripper units;

said control means further including a monitor responsive to empty ones of said gripper units in order to suppress said control pulse; and said control means initiating a printing operation by said printer each time an unsuppressed control pulse is generated.

2. The apparatus as defined in claim 1, wherein:

said printer comprises an ink jet printer.

3. The apparatus as defined in claim 2, wherein:

each gripper unit of said individual conveyor serves to seize a leading edge of said printed products arriving in an imbricated formation;

a guide table for supporting trailing edges of said printed products; and said ink jet printer being arranged at the region of said guide table and being directed from below towards said arriving imbricated product formation.

4. A shipping system, comprising:

apparatus for addressing newspapers, journals, periodicals and other printed products;

said apparatus comprising:

a stationary ink jet printer defining a printing station for applying an address to the printed products;

conveying means for guiding said printed products past said ink jet printer;

said conveying means and said printer having coordinated conveying and printing velocities;

said conveying means comprising an individual conveyor equipped with gripper units arranged in spaced relationship from each other and structured to each take-up one of said printed products;

control means associated with said individual conveyor and including means for generating a control pulse at the passage of each one of said gripper units;

said control means further including a monitor responsive to empty ones of said gripper units in order to suppress said control pulse;

collecting stations past which a portion of said individual conveyor is directed following said addressing apparatus;

each said collecting station comprising an opening device for acting upon said gripper units of said individual conveyor;

said control means including a computer associated with said ink jet printer; and said computer controlling said opening devices in order to selectively assume an operative or an inoperative position as a function of unsuppressed control pulses in order to selectively deliver said printed products, after having been addressed, to said collecting stations in accordance with said address.

* * * * *